March 17, 1970    K. RÖDER ET AL    3,500,702
FOOT PEDAL
Filed June 28, 1968
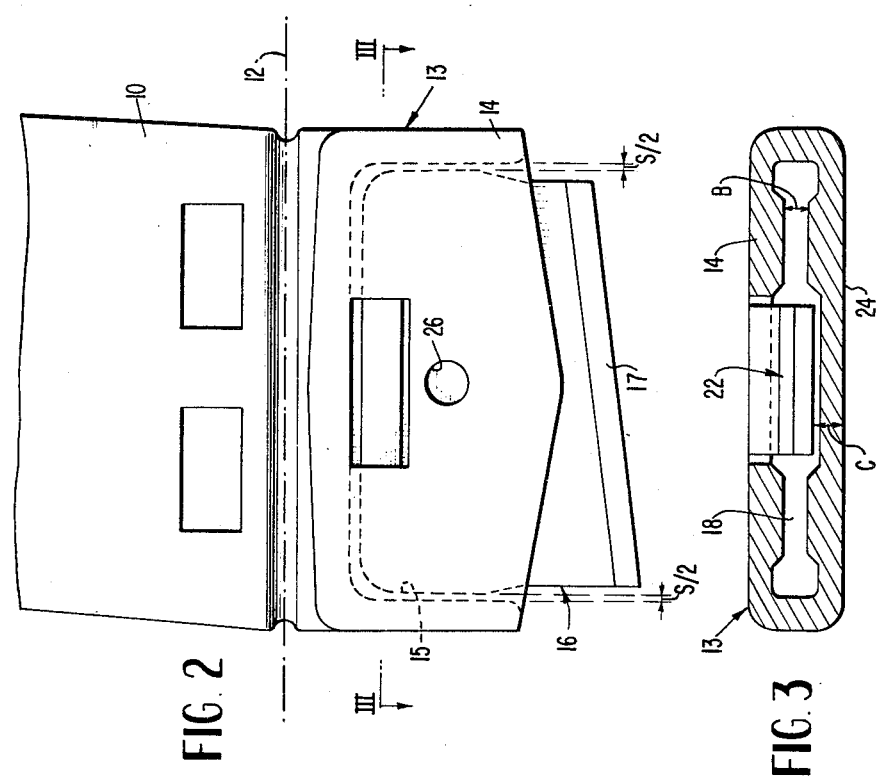
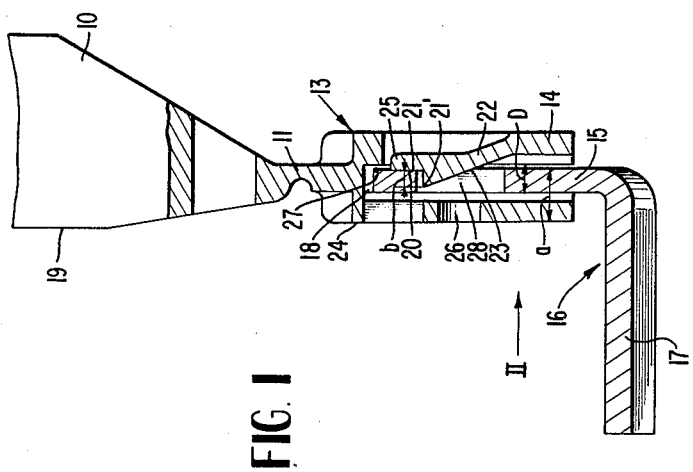
INVENTORS
KARL RÖDER
WALTRUD NAUTSCH
BY *Craig e Antonelli*
ATTORNEYS even a slight lateral movement of the foot pedal, is provided at the slotted socket 14 in order to avoid excessive peak loads between the two connecting parts 13 and 16.

United States Patent Office
3,500,702
FOOT PEDAL

Karl Röder, Stuttgart-Monchfeld, and Waltrud Nautsch, Wulferdingsen, Germany, assignors to Daimler-Benz Aktiengesellschaft, Stuttgart-Unterturkheim, Germany
Filed June 28, 1968, Ser. No. 741,060
Claims priority, application Germany, July 1, 1967, 1,630,310
Int. Cl. G05g 1/14
U.S. Cl. 74—560                          27 Claims

---

ABSTRACT OF THE DISCLOSURE

A drive pedal, especially for motor vehicles, in which two connecting parts are provided for a detachable connection, whereby one connecting part is connected with the footplate so as to pivot about an axis and includes a slotted socket for a plate-like shaped part of the second connecting part which is rigidly secured at the floor of the vehicle.

---

The present invention relates to a drive pedal, especially for motor vehicles in which a first one of two connecting parts of a disengageable connection is arranged at the footplate and the second connecting part is rigidly secured at a floor part of the vehicle whereas one of the connecting parts has at least one shaped part or molded body which is adapted to be form-lockingly inserted into a corresponding recess or aperture of the other connecting part.

The aim underlying the present invention essentially resides in improving a drive pedal of this type. For this purpose, provision is made according to the present invention that the first connecting part is connected with the footplate pivotal about an axis and includes a slotted socket or fitting for the plate-like shaped part of the second connecting part.

Several advantages are attained by the present invention. The plate-like shaped part and the slotted socket form a torsion-resistant connection so that the forces engaging at the foot pedal about the longitudinal axis thereof are safely supported. Consequently, the connection between the drive pedal and the linkage leading to the adjusting member for the torque can be constructed in a very simple manner. The driving pedal can be assembled rapidly and without great expenditures in that exclusively the slotted socket or fitting is placed over the plate-like shaped part.

Accordingly, it is an object of the present invention to provide a drive pedal for motor vehicles which avoids the aforementioned shortcomings and drawbacks encountered in the prior art.

Another object of the present invention resides in an improved gas pedal for motor vehicles which assures a torsion-resistant connection between the parts to be connected.

A further object of the present invention resides in a driving pedal for motor vehicles which permits a very simple connection between the driving pedal and the linkage leading to the adjusting member for the driving torque.

Still another object of the present invention resides in a drive pedal which can be readily installed and removed without any difficulties.

A still further object of the present invention resides in a drive pedal of the type described above which obviates the need for special guide and support means of the footplate.

These and other objects, features, and advantages of the present invention will become more obvious from the following description when taken in connection with the accompanying drawing which shows, for purposes of illustration only, one embodiment of a driving pedal in accordance with the present invention, and wherein:

FIGURE 1 is a cross-sectional view through the drive pedal with the connecting parts in accordance with the present invention;

FIGURE 2 is an elevational view taken in the direction of arrow II of FIGURE 1; and FIGURE 3 is a cross-sectional view taken along line III—III of FIGURE 2, through the slotted socket of the first connecting part.

Referring now to the drawing wherein like reference numerals are used throughout the various views to designate like parts, the footplate 10 of the drive pedal is connected with the first connecting part generally designated by reference numeral 13 by way of a thin web 11 so as to be pivotal about an axis 12. The parts 10, 11 and 13 are made in one piece of synthetic plastic material. The first connecting part 13 includes a slotted socket or fitting 14 for a plate-like shaped part 15 of the second connecting part generally designated by reference numeral 16. The second connecting part 16 is provided with an angularly bent portion 17 which is rigidly secured in a conventional manner (not shown) at a floor part of the vehicle.

Both the axis 12 as well as the slot 18 of the slotted socket 14 extend parallel to the abutment surface 19 for the foot of the footplate 10. The abutment surface 19 may be covered with a yieldable damping cover.

The shaped part 15 has laterally a predetermined play S with respect to the slot 18 (FIG. 2) so that the footplate 10 is movably arranged in the plane of the drawing of FIGURE 2 with respect to the second connecting part 16. Alignment errors between the footplate 10 and the linkage (not shown) to the adjusting member for the torque can be compensated thereby.

As a result of the cooperation of the torsion-resistant slotted socket 14 with the plate-like shaped part 15, the footplate 10 is advantageously supported in case of a force engagement about its longitudinal axis without the possibility of the occurrence of a disengagement of the connecting parts 13 and 16. As a result thereof, the lever linkage at the other end (not shown) of the footplate 10 can be exclusively pivotally connected at the latter in a simple manner. Special measures for the guidance and/or support of the footplate 10 can thus be dispensed with at the end thereof on the side of the linkage.

Also, the assembly of the drive pedal 10 is simple and time-saving because the first connecting part 13 with the slotted socket 14 is secured at the second connecting part 16 by a simple plug-like emplacement over the plate-like shaped part 15.

An automatic stop between the two connecting parts 13 and 16 is achieved by a rigid abutment surface 20 at the shaped part 15, against which abuts an elastic abutment surface 21 at the slotted socket 14 after the shaped part 15 is introduced into the socket 18.

An abutment edge 21' which is able to deflect elastically, is arranged at a tongue-shaped wall part 22 of the slotted socket 14. The wall part 22 also has an engagement surface 23 inclined to the slot 18, at which engages the forward edge 27 of the shaped part 15 during the insertion into the slot 18. In this manner, the abutment edge 21' is automatically displaced into a disengaging or release position during the assembly of the drive pedal, in which this edge 21' has a distance $a$ from the opposite outer surface 24 of the slotted socket 14. In the locking position illustrated in FIGURE 1, the abutment edge 21' has a distance $a-b$ with respect to the surface 24 which is larger by a predetermined spring deflection path than the distance C (FIG. 3) of the freely released abutment edge 21 from the surface 24.

By reason of this arrangement, the abutment part 22 abuts with an overhanging portion 25 in the locking position of the abutment edge 21 force-lockingly against the shape part 15 so that rattle noises are avoided between the connecting parts 13 and 16. For this purpose, the play between the inner width B (FIG. 3) of the slot 18 and of the thickness D (FIG. 1) of the shaped part 15 can be selected sufficiently smaller.

In order to be able to release the locking action of the two connecting parts 13 and 16 in a simple manner, the wall disposed opposite the abutment portion 22 is provided with a through-bore 26 into which a suitable tool for the spring deflection of the abutment part 22 can be inserted. An aperture 28 is arranged in the shaped part 15 coaxially to the through-bore 26 whose other wall part is constituted by the abutment edge 20.

While we have shown and described only one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A drive pedal, especially for motor vehicles, which comprises a detachable connection with two separable parts, of which one is arranged at a footplate and the other one is rigidly secured at a floor part of the vehicle, wherein the improvement comprises slotted socket means at a first one of said two parts, and a plate-shaped part at the second of said parts to be form-lockingly inserted into a corresponding aperture formed by said socket means.

2. A drive pedal according to claim 1, wherein said first connecting part having the socket means is operatively connected with a footplate pivotal about an axis and the second part is rigidly secured at the vehicle floor.

3. A drive pedal according to claim 2, wherein said first connecting part is connected with the footplate by way of a thin web portion.

4. A drive pedal according to claim 3, wherein the first connecting part as well as the web portion and the footplate are constructed in one piece.

5. A drive pedal according to claim 3, wherein said first connecting part, said web portion, and said footplate are made in one piece from synthetic resinous material.

6. A drive pedal according to claim 4, wherein said shaped part is guided movable in a plane within the corresponding aperture formed by the slotted socket means by a preselected play.

7. A drive pedal according to claim 6, wherein one of said connecting parts has a rigid first abutment means and the other connecting part a second abutment means adapted to spring-deflect from a locking position into a releasing position.

8. A drive pedal according to claim 7, wherein said first abutment means is arranged at said shaped part and forms first edge means and wherein said second abutment means is arranged at said socket means and forms second edge means.

9. A drive pedal according to claim 8, wherein the second abutment means of the one connecting part is brought into the releasing position by the engagement of the other connecting part during the insertion of the shaped part into the corresponding aperture and spring-deflects automatically into the locking position with the shaped part in the normal engaged position, in which the first abutment means cooperates with the spring-deflecting second abutment means and prevents the disengagement of the connecting parts.

10. A drive pedal according to claim 9, wherein a tongue-shaped wall portion of the slotted socket means extends into the slot of the first connecting part.

11. A drive pedal according to claim 10, wherein the shaped part is provided with an aperture for the engagement of the tongue-shaped wall portion.

12. A drive pedal according to claim 11, wherein the wall of the slotted socket means disposed opposite the tongue-shaped wall portion is provided with an aperture.

13. A drive pedal according to claim 12, wherein the tongue-shaped wall portion has at least one projecting portion which abuts in the locking position under prestress against the shaped part.

14. A drive pedal according to claim 1, wherein said first connecting part is connected with the footplate by way of a thin web portion.

15. A drive pedal according to claim 14, wherein the first connecting part as well as the web portion and the footplate are constructed in one piece.

16. A drive pedal according to claim 14, wherein said first connecting part, said web portion and said footplate are made in one piece from synthetic resinous material.

17. A drive pedal according to claim 2, wherein said shaped part is guided movable in a plane within the corresponding aperture formed by the slotted socket means by a preselected play.

18. A drive pedal according to claim 2, wherein one of said connecting parts has a rigid first abutment means and the other connecting part a second abutment means adapted to spring-deflect from a locking position into a releasing position.

19. A drive pedal according to claim 18, wherein said first abutment means is arranged at said shaped part and forms first edge means and wherein said second abutment means is arranged at said socket means and forms second edge means.

20. A drive pedal according to claim 18, wherein the second abutment means of the one connecting part is brought into the releasing position by the engagement of the other connecting part during the insertion of the shaped part into the corresponding aperture and spring-deflects automatically into the locking position with the shaped part in the normal engaged position, in which the first abutment means cooperates with the spring-deflecting second abutment means and prevents the disengagement of the connecting parts.

21. A drive pedal according to claim 1, wherein a tongue-shaped wall portion of the slotted socket means extends into the slot of the first connecting part.

22. A drive pedal according to claim 21, wherein the shaped part is provided with an aperture for the engagement of the tongue-shaped wall portion.

23. A drive pedal according to claim 22, wherein the wall of the slotted socket means disposed opposite the tongue-shaped wall portion is provided with an aperture.

24. A drive pedal according to claim 23, wherein the tongue-shaped wall portion has at least one projecting portion which abuts in the locking position under prestress against the shaped part.

25. A drive pedal according to claim 1, wherein one of said connecting parts has a rigid first abutment means and the other connecting part a second abutment means adapted to spring-deflect from a locking position into a releasing position.

26. A drive pedal according to claim 25, wherein the second abutment means of the one connecting part is brought into the releasing position by the engagement of the other connecting part during the insertion of the shaped part into the corresponding aperture and spring-deflects automatically into the locking position with the shaped part in the normal engaged position in which the first abutment means cooperates with the spring-deflecting second abutment means and prevents the disengagement of the connecting parts.

27. A drive pedal according to claim 26, wherein a tongue-shaped wall portion of the slotted socket means extends into the slot of the first connecting part.

References Cited

UNITED STATES PATENTS

| 2,203,933 | 6/1940 | Thorp | 74—560 XR |
| 2,406,161 | 8/1946 | Paymer | 74—513 |
| 2,766,640 | 10/1956 | Ellsworth | 74—560 XR |
| 3,125,896 | 3/1964 | Beisel | 74—513 |

FRED C. MATTERN, Jr., Primary Examiner

F. D. SHOEMAKER, Assistant Examiner